United States Patent [19]

Hanamoto

[11] Patent Number: 5,157,533
[45] Date of Patent: Oct. 20, 1992

[54] MULTI-BEAM OPTICAL SYSTEM

[75] Inventor: Hiroyuki Hanamoto, Aichi, Japan

[73] Assignee: Minolta Camera Co., Ltd., Osaka, Japan

[21] Appl. No.: 661,690

[22] Filed: Feb. 26, 1991

[30] Foreign Application Priority Data

Feb. 26, 1990 [JP] Japan ................... 2-46460

[51] Int. Cl.⁵ .............................. G02B 26/10
[52] U.S. Cl. ................... 359/204; 359/217; 359/629; 250/236; 346/108
[58] Field of Search ............ 359/204, 618, 629, 633, 359/634, 635, 196, 217; 358/75, 480, 300; 346/108, 157, 160; 250/236

[56] References Cited

U.S. PATENT DOCUMENTS

| | | | |
|---|---|---|---|
| 3,794,407 | 2/1974 | Nishimura | 359/634 X |
| 4,941,003 | 7/1940 | Takade et al. | 346/160 |
| 5,068,677 | 11/1991 | Matsuura et al. | 346/108 |

FOREIGN PATENT DOCUMENTS

| | | |
|---|---|---|
| 62-104215 | 7/1987 | Japan . |
| 64-909 | 1/1989 | Japan . |
| 60201319 | 10/1989 | Japan . |
| 3-2712 | 1/1991 | Japan ................... 359/204 |

*Primary Examiner*—Constantine Hannaher
*Assistant Examiner*—Edward J. Glick
*Attorney, Agent, or Firm*—Price, Gess & Ubell

[57] ABSTRACT

A multi-beam optical system is provided with reflecting mirrors and separating mirrors on optical paths of light beams for each color so that the difference of the numbers of reflections of the scanned light beams for the respective colors when they penetrate through the lens and reach the photosensitive drum can be the same or an even number. The ference of the number of reflections of the scanned light beams for the respective color can become an even number and the scanning lines are distorted in the same direction by the lens, and are thus not liable to lose a parallel relation between the line images.

15 Claims, 10 Drawing Sheets

MULTI-BEAM OPTICAL SYSTEM

BACKGROUND OF THE INVENTION

1. Field of the Invention

The present invention relates to a multi-beam optical system, and more particularly, it relates to a multi-beam optical system for use in an optical system of an image formation such as a multi-color copying machine, color laser printer, or the like.

2. Description of the Related Art

A multi-beam optical system for use on an optical system of an image formation apparatus such as a multi-color copying machine, color laser printer, or the like forms images of plural colors by irradiating respective light beams emitted from plural light sources onto different locations of a beam receiving surface. In accordance with difference in the characteristics of the light beams, it can compose those light beams in the middle portion of optical paths of those light beams and can scan the composed light beams by one scanning means and then separate the scanned light beams according to the differences of the characteristics of those light beams.

Generally in such a multi-beam optical system as mentioned above, there is used a semiconductor laser element as the light source, accordingly, the light beam becomes a laser light. In addition, there are many cases where a polygon mirror is used as the scanning means and a photosensitive drum as the beam receiving surface, respectively.

Now will be described below an example of details of such a conventional multi-beam optical system as mentioned above.

FIG. 1 is a schematic side elevation to illustrate construction of the conventional two-beam optical system.

This two-beam optical system is provided with two semiconductor laser elements 61 and 62 each of which outputs a laser light which is modulated based on the image data obtained by an image reader (not shown), a composing mirror 63, a polygon mirror 65, a lens 69, a photosensitive drum 71, reflecting mirrors 67a, 67b and 67c, a separating mirror 68, and the like.

Each of the semiconductor laser elements 61 and 62 emit a laser light of a different wavelength from each other. In the example of the conventional system, the semiconductor laser element 61 emits a laser light 13a of 810 nm wavelength and the semiconductor laser element 62 emits a laser light 13b of 750 nm of wavelength, respectively. There are arranged, both a semiconductor laser element 61 behind the composing mirror 63 on a straight line connecting the composing mirror 63 and the polygon mirror 65, and the semiconductor laser element 62 in an offset position in front of the composing mirror 63.

The composing mirror 63 consists of a dichroic mirror which transmits a laser light of 780 nm or more wavelength and reflects a laser light of less than 780 nm of wavelength, for example. Accordingly, the laser light 13a emitted from the semiconductor laser element 61 penetrates through the composing mirror 63 and travels toward the polygon mirror 65, and the laser light 13b emitted from the semiconductor laser element 62 is reflected by the composing mirror 63 and travels toward the polygon mirror 65. As a result, both laser light 13a and 13b are composed as one composite laser light 13c and the composite laser light 13c is made to be incident on the polygon mirror 65 from the composing mirror 63.

The composite laser light 13c is deflected by the rotating polygon mirror 65, penetrates through the lens 69 and is reflected by the reflecting mirror 67a, reaching the separating mirror 68.

The separating mirror 68 has the same characterisitic as the above-mentioned composing mirror 63, and it transmits the laser light 13a emitted from the semiconductor laser element 61 out of the composite laser light 13c and reflects the laser light 13b emitted from the semiconductor laser element 62. As a result, the laser light 13a penetrates through the separating mirror 68 and travels a straight optical path, and the laser light 13b is reflected by the separating mirror 68 and travels another optical path different from that of the laser light 13a.

As can be seen from the above description, both of the laser lights 13a and 13b being separated from the composite laser light 13c by the separating mirror 68 travel their respective optical paths and reach different locations on the photosensitive drum 71 which is the beam receiving surface. The laser light 13a is reflected by the reflecting mirror 67b disposed on its optical path and reaches the photosensitive drum 71. On the other hand, the laser light 13b is reflected by the reflecting mirror 67c disposed on its optical path and reaches the photosensitive drum 71.

Both of the laser lights 13a and 13b form electrostatic latent images on the photosensitive drum 71. At this time, in the case where the electrostatic latent image formed by the laser light 13a is developed with a black developer and the electrostatic latent image formed by the laser light 13b is developed with a color developer, such as a red developer, respectively, there can be obtained a multi-color (two colors in this case) hard copy.

Meanwhile, the polygon mirror 65 deflects the composite laser light 13c so that the composite laser light 13c can form a straight scanning line in a direction parallel to the axial direction of the photosensitive drum 71. However, a laser light which penetrates through the lens 69 generally forms an arcing scanning line because of the characteristic and distortion of the lens.

FIG. 2 is a schematic view to illustrate configurations of scanning lines La and Lb to be formed on the photosensitive drum 71 by both laser lights 13a and 13b, respectively.

Assuming that there is formed an upwardly convex arcing scanning line at point that a laser light penetrates through the lens 69, for example, the laser light 13a which was reflected a total of twice by the reflecting mirrors 67a and 67b, than the upwardly convex arcing scanning line La (shown by the broken line in FIG. 2) is formed on the photosensitive drum 71. On the other hand, the laser light 13b which was reflected a total of three times by the reflecting mirror 67a, the separating mirror 68 and the reflecting mirror 67c forms the downwardly convex arcing scanning line Lb (shown by the solid line in FIG. 2) on the photosenstive drum 71. As a result, two scanning lines La and Lb formed on the photosenitive drum 71 by the laser lights lights 13a and 13b, respectively are not a parallel relationship with each other.

In the case where an image of a black line and an image of a red line in a parallel relationship with each other are formed in a multi-color, there will be formed the image of a black line by such an upwardly convex scanning line La of the laser light 13a as shown by the broke line in FIG. 2 and the image of a red line by such a downwardly convex scanning line Lb of the laser light 13b as shown by the solid line in FIG. 2. As a result, there is a difference between a distance in the central portion of the black line image and red line image and a distance in both end portions of these images, and in an extreme case, there is formed images of both the black and red lines being crossed.

As may be clear from the above description, it may be hard to reproduce good images by the conventional multi-beam optical system.

SUMMARY OF THE INVENTION

The foregoing inconvenience is overcome in accordance with the present invention, and the primary object of the invention is to provide a multi-beam optical system capable of keeping a parallel relation between scanning lines of a plurality of light beams.

The multi-beam optical system of the present invention is provided with reflecting mirrors and separating mirrors on optical paths of light beams so that difference of the numbers of reflections of the scanned light beams while they penetrate through the lens and reach the beam receiving surface can be equally to each other or equal to an even number.

In the multi-beam optical system of the present invention, the difference of the number of reflections of the scanned light beams becomes an even number and the scanning lines are distorted in the same direction by the lens, and then it is not liable to lose a parallel relation between the line images.

The above and further objects and features of the invention will more fully be apparent from the following detailed description with accompanying drawings.

DESCRIPTION OF THE PREFERRED EMBODIMENTS

Now will be described below preferred embodiments of the present invention with reference to the accompanying drawings.

Figure 1:
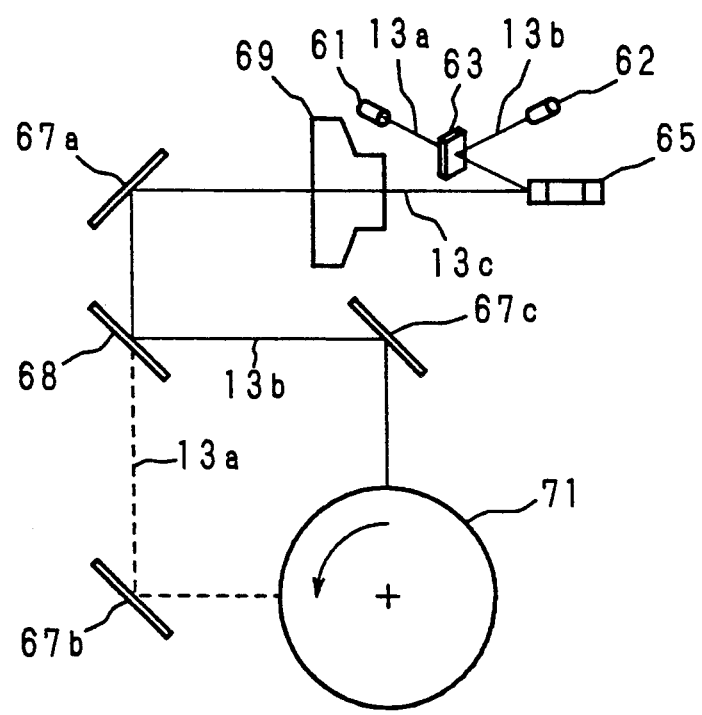
FIG. 1 is a schematic side elevation to illustrate construction of the conventional two-beam optical system.
Figure 2:
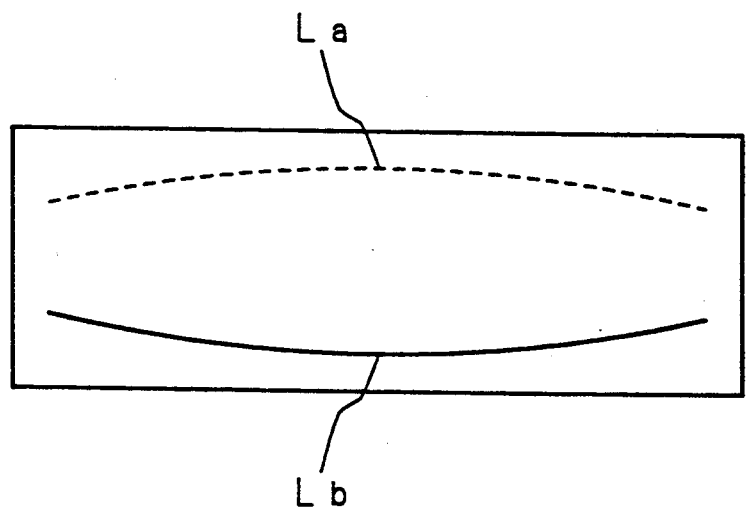
FIG. 2 is a schematic view to illustrate configurations of scanning lines being formed on a photosensitive drum by two laser lights of FIG. 2.
Figure 3:
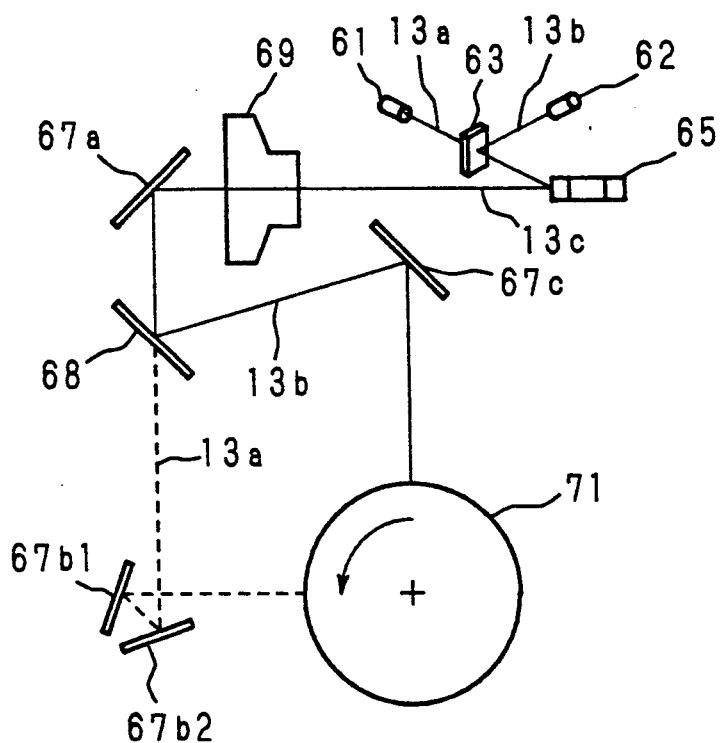
FIG. 3 is a schematic side elevation to illustrate one example of construction of a two beam optical system of the first preferred embodiment of the present invention.

FIG. 3 is a schematic side elevation view to illustrate one example of a construction of the two-beam optical system of the first embodiment of the invention.

This two-beam optical system is provided with two semiconductor laser elements 61 and 62 each of which outputs a laser light being modulated based on the image data obtained by an image reader (not shown), a composing mirror 63, a polygon mirror 65, a lens 69, a photosensitive drum 71, reflecting mirrors 67a, 67b1, 67b2 and 67c, a separating mirror 68, and the like.

Each of the semiconductor laser elements 61 and 62 emit a laser light of a different wavelength from each other. In the embodiment of the invention, the semiconductor laser element 61 emits a laser light 13a of 810 nm wavelengths and the semiconductor laser element 62 emits a laser light 13b of 750 nm wavelength, respectively, for example. The semiconductor laser element 61 is arranged behind the composing mirror 63 on a straight line connecting the composing mirror 63 and the polygon mirror 65, and the semiconductor laser element 62 is positioned in an offset position in front of the composing mirror 63.

The composing mirror 63 consists of a dichroic mirror which transmits a laser light of 780 nm or more of wavelength and reflects a laser light of less than 780 nm wavelength for example. Accordingly, the laser light 13a emitted from the semiconductor laser element 61 penetrates through the composing mirror 63 and travels toward the polygon mirror 65, and the laser light 13b emitted from the semiconductor laser element 62 is reflected by the composing mirror 63 and travels toward the polygon mirror 65. As a result, both of the laser lights 13a and 13b are composed as one composite laser light 13c and the composite laser light 13c is made to be incident on the polygon mirror 65 from the composing mirror 63.

The composite laser light 13c is deflected by the rotating polygon mirror 65, penetrates through the lens 69 and is reflected by the reflecting mirror 67a, reaching the separating mirror 68.

The separating mirror 68 has the same characteristic as the above-mentioned composing mirror 63, and it transmits the laser light 13a emitted from the semiconductor laser element 61 out of the composite laser light 13c and reflects the laser light 13b emitted from the semiconductor laser element 62. As a result, the laser light 13a penetrates through the separating mirror 68 and travels a straight optical path, and the laser light 13b is reflected by the separating mirror 68 and travels another optical path different from that of the laser light 13a.

As can be seen from the above description, both of the laser lights 13a and 13b are separated from the composite laser light 13c by the separating mirror 68 as they travel their respective optical paths and reach different locations on the photosensitive drum 71. The laser light 13a is reflected by the reflecting mirror 67b2 disposed on its optical path, reaches and finally is reflected again by the reflecting mirror 67b1, and reaches the photosensitive drum 71. On the other hand, the laser light 13b is reflected by the reflecting mirror 67c disposed on its optical path and reaches the photosensitive drum 71.

Both of the laser lights 13a and 13b form electrostatic latent images on the photosensitive drum 71. At this time, in the case where the electrostatic latent image formed by the laser light 13a is developed with a black developer and the electrostatic latent image formed by the laser light 13b is developed with a color developer, such as a red developer, respectively, there can be obtained a multi-color (two colors in this case) hard copy.

Meanwhile, the polygon mirror 65 deflects the composite laser light 13c so that the composite laser light 13c can form a straight scanning line in a direction parallel to the axial direction of the photosensitive drum 71. However, a laser light which penetrates through the lens 69 generally forms an arcing scanning line because of the characteristic distortion of the lens.

Figure 4:
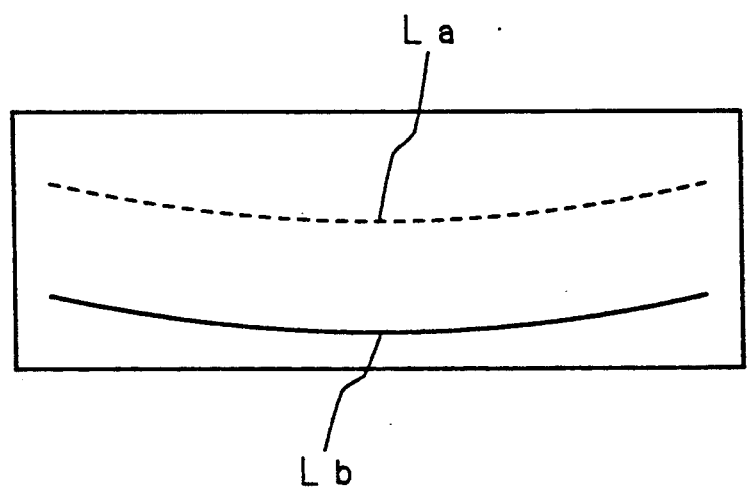
FIG. 4 is a schematic view to illustrate configurations of scanning lines being formed on a photosensitive drum by two laser lights of FIG. 3.

FIG. 4 is a schematic view to illustrate configurations of scanning lines La and Lb to be formed on the photosensitive drum 71 by both laser lights 13a and 13b, respectively.

Assuming that there is formed an upwardly convex arcing scanning line at point that a laser light penetrates through the lens 69, for example, the laser light 13a which was reflected a total of three times by the reflecting mirrors 67a, 67b2 and 67b1, form the downwardly convex arcing scanning line La (shown by the broken line in FIG. 4) on the photosensitive drum 71. On the other hand, the laser light 13b which was reflected a total of three times by the reflecting mirror 67a, the separating mirror 68 and the reflecting mirror 67c forms the downwardly convex arcing scanning line Lb (shown by the solid line in FIG. 4) on the photosensitive drum 71. As a result, the two scanning lines La and Lb formed on the photosensitive drum 71 by the laser lights 13a and 13b, respectively are in parallel relationship with each other.

Where an image of a black line and an image of a red line, in a parallel relationship with each other, are formed in a multi-color image, the image of the black line is a downwardly convex scanning line La of the laser light 13a as shown by the broke line in FIG. 4 and the image of the red line is a downwardly convex scanning line Lb of the laser light 13b as shown by the solid line in FIG. 4. As a result, the images of the both lines are not crossed, and the reproduction images are faithful to the originals are obtained as a hard copy.

As mentioned above, in the first embodiment of the present invention, the laser light 13a is reflected a total of three times by the reflecting mirrors 67a, 67b2 and 67b1 on its optical path after it penetrated through the lens 69 and reaches the photosensitive drum 71. On the other hand, the laser light 13b is reflected a total of three times by the reflecting mirror 67a, separating mirror 68 and reflecting mirror 67c on its optical path after it penetrated through the lens 69 and reaches the photosensitive drum 71. Accordingly, the numbers of reflections between the both laser lights 13a and 13b are the same and their difference is 0.

Now will be described below a second embodiment of the invention.

Figure 5:
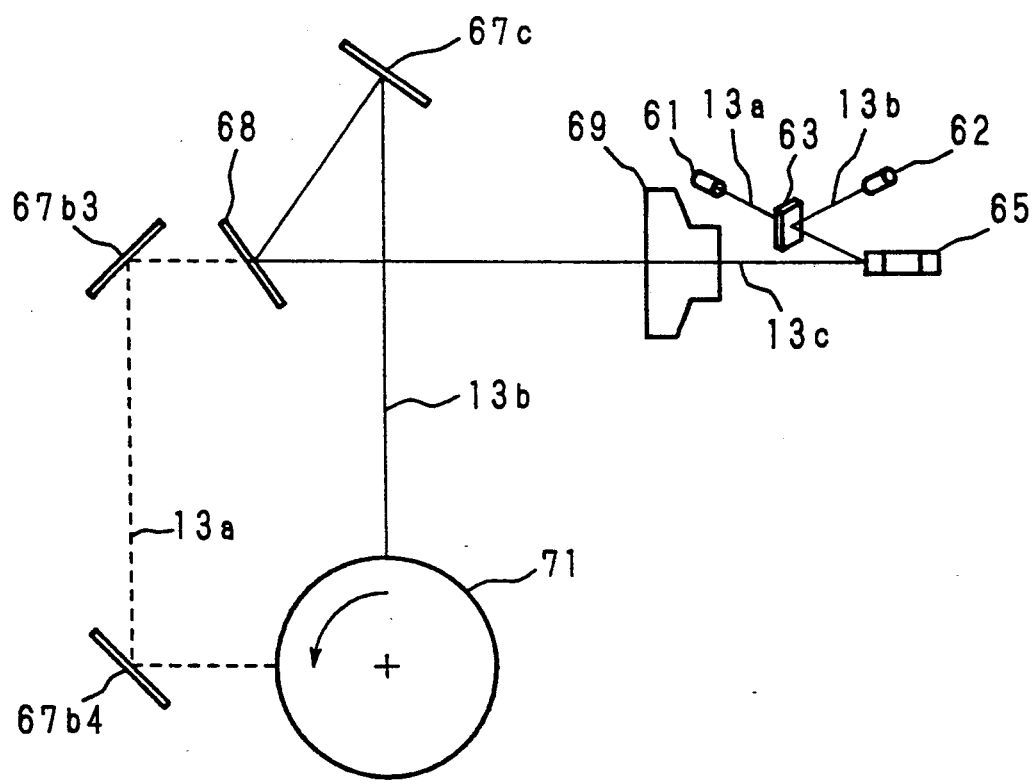
FIG. 5 is a schematic side elevation to illustrate one example of construction of the two-beam optical system of the second preferred embodiment of the present invention.

FIG. 5 is a schematic side elevation view to illustrate one example of a construction of the two-beam optical system of the second embodiment of the invention.

Incidentally, in the second embodiment of the invention of FIG. 5, those elements numbered identically with the first embodiment of FIG. 3 perform the same or similar functions, and their explanation will be omitted here.

The only difference of the second embodiment from the first embodiment is optical paths of the laser lights 13a and 13b after those lights 13a and 13b have penetrated through the lens 69. In other words, the composite laser light 13c which penetrated through the lens 69 reaches the separating mirror 68 first. As in the case of the first embodiment, the separating mirror 68 separates the laser lights 13a and 13b from the composite laser light 13c by transmitting the laser light 13a and by reflecting the laser light 13b out of the composite laser light 13c, respectively.

After penetrating through the separating mirror 68, an optical path of the laser light 13a separated from the composite laser light 13c by the separating mirror 68 is reflected by the reflecting mirror 67b3 disposed on the optical path and then reaches and is reflected again by the reflecting mirror 67b4, before reaching the photosensitive drum 71. On the other hand, after being reflected by the separating mirror 68, an optical path of the laser light 13b separated from the composite laser light 13c by the separating mirror 68 is reflected by the reflecting mirror 67c disposed on the optical path and reaches the photosensitive drum 71.

Figure 6:
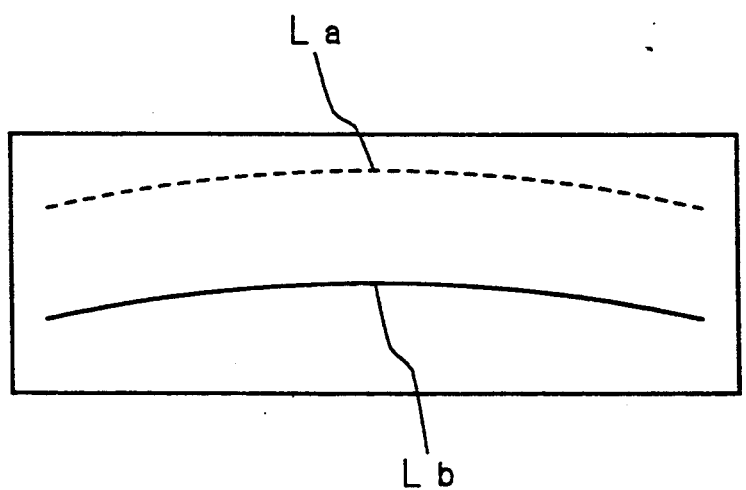
FIG. 6 is a schematic view to illustrate configurations of scanning lines being formed on a photosensitive drum by two laser lights of FIG. 5.

FIG. 6 is a schematic view to illustrate configurations of scanning lines La and Lb to be formed on the photosensitive drum 71 by the laser lights 13a and 13b, respectively.

Assuming that there is formed an upwardly convex arcing scanning line at point that a laser light penetrates through the lens 69, for example, the laser light 13a which was reflected a total of twice by the reflecting mirrors 67b3 and 67b4, forms the upwardly convex arcing scanning line La (shown by the broken line in FIG. 6) on the photosensitive drum 71. On the other hand, the laser light 13b which was reflected a total of twice by the separating mirror 68 and the reflecting mirror 67c forms the upwardly convex arcing scanning line Lb (shown by the solid line in FIG. 6) on the photosensitive drum 71. As a result, two scanning lines La and Lb formed on the photosensitive drum 71 by the laser lights 13a and 13b, respectively are in parallel relationship with each other.

Where an image of a black line and an image of a red line in a parallel relationship with each other are formed in a multi-color image, there are formed the image of black upwardly convex scanning line La of the laser light 13a as shown by the broke line in FIG. 6 and the image of a red upwardly convex scanning line Lb of the laser light 13b as shown by the solid line in FIG. 6. As a result, the images of both lines are not crossed, and reproduction images faithful to the originals are obtained as a hard copy.

As mentioned above, in the second embodiment of the present invention, the laser light 13a is reflected a total of twice by the reflecting mirrors 67b3 and 67b4 on its optical path after it penetrated through the lens 69 and reaches the photosensitive drum 71. On the other hand, the laser light 13b is reflected a total of twice by the separating mirror 68 and the reflecting mirror 67c on its optical path after it penetrated through the lens 69 and reaches the photosensitive drum 71. Accordingly, the numbers of reflections between the both laser lights 13a and 13b are the same and their difference is 0.

Now will be described below a third embodiment of the invention.

Figure 7:
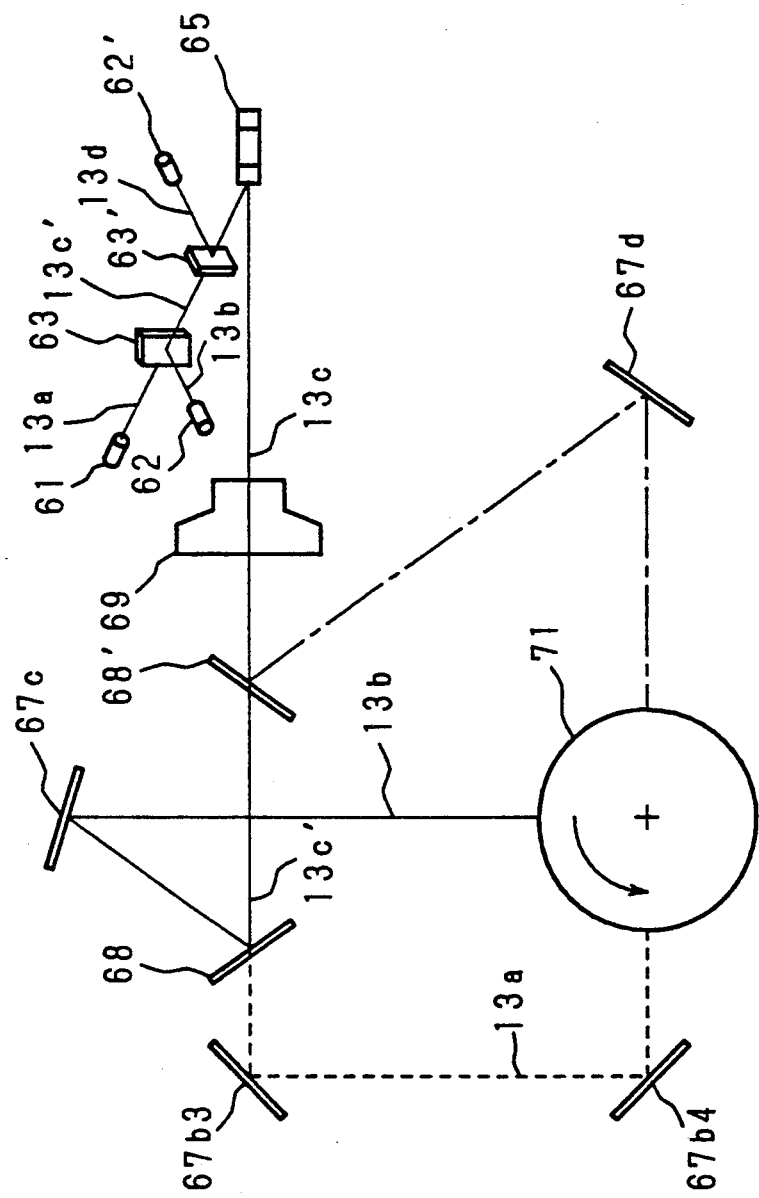
FIG. 7 is a schematic side elevation to illustrate one example of construction of a three-beam optical system of the third embodiment of the invention.

FIG. 7 is a schematic side elevation to illustrate one example of a construction of the three-beam optical system of the third embodiment of the invention.

Incidentally, in the third embodiment of the invention of FIG. 7, those elements numbered identically with the second embodiment of FIG. 5 perform the same or similar functions, and their explanation will be omitted here.

Portions of the third embodiment of the invention which are different from the second embodiment are three pieces of semiconductor laser elements 61, 62 and 62' which emit the laser lights 13a, 13b and 13d, respectively. The semiconductor laser element 61 is arranged behind the composing mirror 63 on a straight line connecting the polygon mirror 65 and the composing mirror 63. Another composing mirror 63' is arranged in the middle of the straight line connecting the polygon mirror 65 and the composing mirror 63, and the semiconductor laser element 62' is offset and arranged at the side of the polygon mirror 65 of the composing mirror 63'. The semiconductor laser element 62 is offset and arranged at the side of the polygon mirror 65 of the composing mirror 63.

For example, the semiconductor laser element 61 emits the laser light 13a of 810 nm wavelength, the semiconductor laser element 62 emits the laser light 13b of 780 nm wavelength, and the semiconductor laser element 62' emits the laser light 13d of 750 nm wavelength, respectively.

The composing mirror 63 consists of a dichroic mirror which transmits a laser light of 795 nm or more of wavelength and reflects a laser light of less than 795 nm of wavelength. Another composing mirror 63' consists of a dichroic mirror which transmits a laser light of 765 nm or more of wavelength and reflects a laser light of less than 765 nm.

Accordingly, the laser light 13a emitted from the semiconductor laser element 61 penetrates through the composing mirror 63 and travels toward the composing mirror 63', and the laser light 13b emitted from the semiconductor laser element 62 is reflected by the composing mirror 63 and travels toward the composing mirror 63'. As a result, the laser lights 13a and 13d are composed as one composite laser light 13c' and are made to be incident on the composing mirror 63'. The composite laser light 13c' penetrates through the composing mirror 63' and travels toward the polygon mirror 65, and the laser light 13d emitted from the semiconductor laser element 62' is reflected by the composing mirror 63' and travels toward the polygon mirror 65. Then both laser lights 13c' and 13d are composed as one composite laser light 13c and it is made to be incident on the polygon mirror 65.

The composite laser light 13c which has been scanned by the polygon mirror 65 and has penetrated through the lens 69 reaches the separating mirror 68' first. The separating mirror 68' has the same characteristic as that of the composing mirror 63', and it transmits the laser lights 13a and 13b out of the composite laser light 13c and reflects the laser light 13d. As a result, the laser light 13c' composed of the laser lights 13a and 13b penetrates through the separating mirror 68' and travels its straight optical path, and the laser light 13d is reflected by the separating mirror 68' and travels another optical path different from the composite laser light 13c'.

As mentioned above, the laser light 13d separated from the composite laser light 13c by the separating mirror 68' is reflected by the reflecting mirror 67d disposed on its optical path and reaches the photosensitive drum 71. On the other hand, the composite laser light 13c' which has penetrated through the separating mirror 68' reaches the separating mirror 68 disposed on its optical path.

The separating mirror 68 has the same characteristic as that of the composing mirror 63, and it transmits the laser light 13a out of the composite laser light 13c' and reflects the laser light 13b, separating the laser lights 13a and 13b from the composite laser light 13c'.

After penetrating through the separating mirror 68, an optical path of the laser light 13a separated from the composite laser light 13c' by the separating mirror 68 is reflected by the reflecting mirror 67b3 being disposed on the optical path and then reaches and is reflected again by the reflecting mirror 67b4, before reaching the photosensitive drum 71. On the other hand, after being reflected by the separating mirror 68, an optical path of the laser light 13b separated from the composite laser light 13c' by the separating mirror 68 is reflected by the reflecting mirror 67c disposed on the optical path and before it reaches the photosensitive drum 71.

Figure 8:
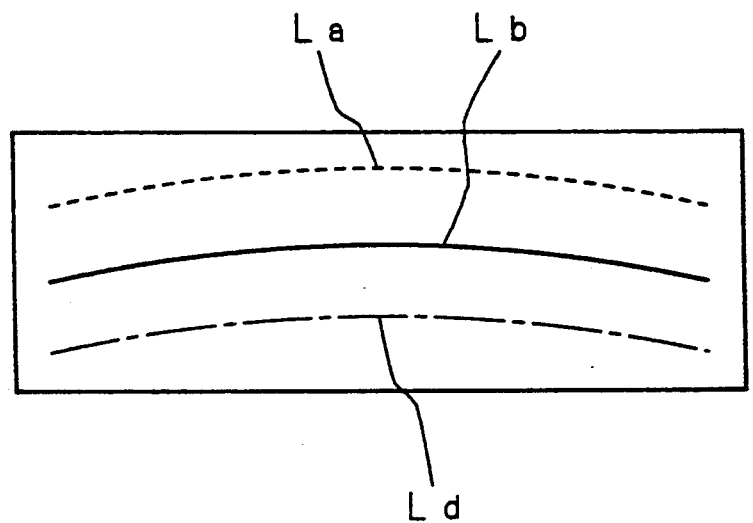
FIG. 8 is a schematic view to illustrate configurations of scanning lines being formed on a photosensitive drum by three laser lights of FIG. 7.

FIG. 8 is a schematic view to illustrate configurations of scanning lines La, Lb and Ld to be formed on the photo-sensitive drum 71 by the both laser lights 13a, 13b and 13d, respectively.

Assuming that there is formed an upwardly convex arcing scanning line at point that a laser light penetrates through the lens 69, for example, the laser light 13a which was reflected a total of twice by the reflecting mirrors 67b3 and 67b4, forms the upwardly convex arcing scanning line La (shown by the broken line in FIG. 8) on the photosensitive drum 71. On the other hand, the laser light 13b which was reflected a total of twice by the separating mirror 68 and the reflecting mirror 67c forms the upwardly convex arcing scanning line Lb (shown by the solid line in FIG. 8) on the photosensitive drum 71. Further, the laser light 13d which was reflected a total of twice by the separating mirror 68' and reflecting mirror 67d forms the upwardly convex arcing scanning line Ld (shown by the alternate long and short dash line in FIG. 8) on the photosensitive drum 71. As a result, three scanning lines La, Lb and Ld formed on the photosensitive drum 71 by the laser lights 13a, 13b and 13d, respectively are in parallel relationship with each other.

Where an image of a black line, an image of a red line and a image of a blue line in a parallel relationship with each other are formed into a multi-color image, there are formed the image of a black line by an upwardly convex scanning line La of the laser light 13a as shown by the broke line in FIG. 8, the image of a red line by a upwardly convex scanning line Lb of the laser light 13b as shown by the solid line in FIG. 8, and the image of a blue line by a upwardly convex scanning line Ld of the laser light 13d as shown by the alternate long and short dash line in FIG. 8. As a result, there the images of the three lines are not crossed, and reproduction images faithful to the originals are obtained as a hard copy.

As mentioned above, in the third embodiment of the present invention, the laser light 13a is reflected a total of twice by the reflecting mirrors 67b3 and 67b4 on its optical path after it penetrated through the lens 69 and reaches the photosensitive drum 71. On the other hand, the laser light 13b is reflected a total of twice by the separating mirror 68 and the reflecting mirror 67c on its optical path after it penetrated through the lens 69 and reaches the photosensitive drum 71. Further, the laser light 13d is reflected a total of twice by the separating mirror 68' and the reflecting mirror 67d on its optical path after it penetrated through the lens 69 and reaches the photosensitive drum 71. Accordingly, the numbers of reflections among the three laser lights 13a, 13b and 13d are the same and any difference in numbers of reflections between each of said laser lights is 0.

Now will be described below a fourth embodiment of the invention.

Figure 9:
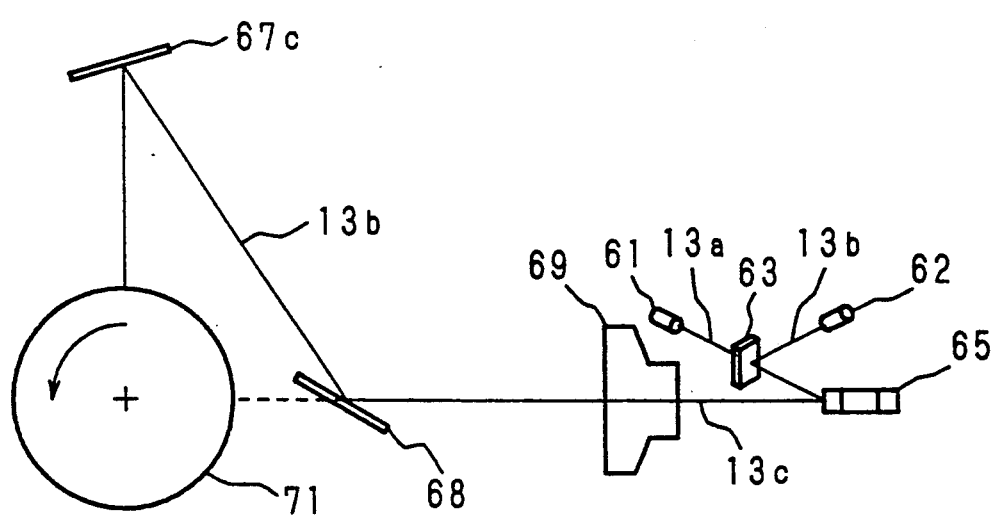
FIG. 9 is schematic side elevation to illustrate one example of construction of the two-beam optical system of the fourth embodiment of the invention.

FIG. 9 is a schematic side elevation to illustrate one example of a construction of the two-beam optical system of the fourth embodiment of the invention.

Incidentally, in the fourth embodiment of the invention of FIG. 9, those elements numbered identically with the first embodiment of FIG. 3 perform the same or similar functions, and their explanation will be omitted here.

The only difference is the fourth embodiment from the first embodiment are the optical paths of the laser lights 13a and 13b after those lights 13a and 13b have through the lens 69. In other words, the composite laser light 13c which penetrated through the lens 69 reaches the separating mirror 68 first. As in the case of the first embodiment, the separating mirror 68 separates the laser lights 13a and 13b from the composite laser light 13c by transmitting the laser light 13a and by reflecting the laser light 13b out of the composite laser light 13c, respectively.

After penetrating through the separating mirror 68, an optical path of the laser light 13a separated from the composite laser light 13c by the separating mirror 68 directly reaches the photosensitive drum 71. On the other hand, after being reflected by the separating mirror 68, an optical path of the laser light 13b separated from the composite laser light 13c by the separating mirror 68 is reflected by the reflecting mirror 67c disposed on the optical path and reaches the photosensitive drum 71.

Figure 10:
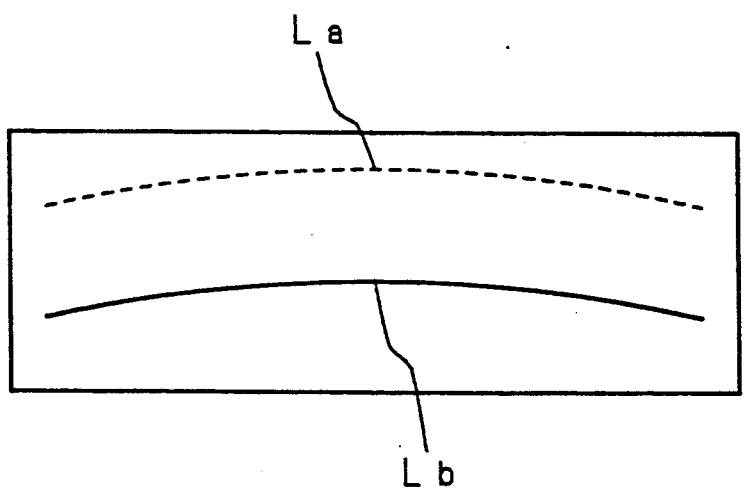
FIG. 10 is a schematic view to illustrate configurations of scanning lines being formed on a photosensitive drum by two laser lights of FIG. 9.

FIG. 10 is a schematic view to illustrate configurations of scanning lines La and Lb to be formed on the photosensitive drum 71 by the laser lights 13a and 13b, respectively.

Assuming that there is formed an upwardly convex arcing scanning line at a point where a laser light penetrates through the lens 69, for example, the laser light 13a which was not reflected by any reflecting mirrors, forms the upwardly convex arcing scanning line La (shown by the broken line in FIG. 10) on the photosensitive drum 71. On the other hand, the laser light 13b which was reflected a total of twice by the separating mirror 68 and the reflecting mirror 67c forms the upwardly convex arcing scanning line Lb (shown by the solid line in FIG. 6) on the photosensitive drum 71. As a result, two scanning lines La and Lb formed on the photosensitive drum 71 by the laser lights 13a and 13b, respectively are in a parallel relationship with each other.

Where an image of a black line and an image of a red line which are in a parallel relationship with each other are formed in a multi-color image, there are formed the image of a black line by such an upwardly convex scanning line La of the laser light 13a as shown by the broke line in FIG. 10 and the image of a red line by such a upwardly convex scanning line Lb of the laser light 13b as shown by the solid line in FIG. 10. As a result, the images of the both lines are not crossed, and reproduction images faithful to the originals are obtained as a hard copy.

As mentioned above, in the fourth embodiment of the present invention, the laser light 13a is not reflected by any reflecting mirrors on its optical path after it penetrated through the lens 69 and reaches the photosensitive drum 71. On the other hand, the laser light 13b is reflected a total of twice by the separating mirror 68 and the reflecting mirror 67c on its optical path after it penetrated through the lens 69 and reaches the photosensitive drum 71. Accordingly, the difference in numbers of reflections between the both laser lights 13a and 13b is 2.

Meanwhile, in the above-mentioned embodiment, dichroic mirrors are employed as the composing mirrors 63 and 63' and the separation mirrors 68 and 68', however a polarization beam splitter which functions according to an angle of polarization of a laser light, a prism, and the like may be employed.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims:

What is claimed is:

1. A multi-beam optical system, comprising:
 a light source for forming an image on a photosensitive member, said light source capable of emitting a plurality of first optical beams;
 composing means for composing all of said plurality of first beams into one single composite beam;
 scanning means for scanning said single composite beam;
 separating means for separating said scanned composite beam into a plurality of scanned separated optical beams, and
 reflecting means for reflecting said scanned separated optical beams onto said photosensitive member, wherein the difference in number of reflections between each of said separated optical beams and each of the other separated optical beams, after said scanning means and before said photosensitive member, is an even number.

2. A multi-beam optical system as set forth in claim 1, wherein said composing means and said separating means comprise dichroic mirrors.

3. A multi-beam optical system as claimed in claim 1, wherein said plurality of first optical beams emitted from said light source are different from each other in optical characteristics.

4. A multi-beam optical system as claimed in claim 3, wherein said separating means separates said composite beam based on their characteristics.

5. A multi-beam optical system as claimed in claim 1, wherein said plurality of scanned optical beams are lead toward different locations on said photosensitive member, respectively.

6. A multi-beam optical system, comprising:
 a light source for forming an image on a photosensitive member, said light source capable of emitting a plurality of first optical beams;
 composing means for composing all of said plurality of first beams into one single composite beam;
 scanning means for scanning said single composite beam;
 separating means for separating said scanned composite beam into a plurality of scanned separated optical beams, wherein said scanned composite beam is separated into two beams of which one beam is reflected by said separating means and another beam is transmitted through said separating means, and reflecting means for reflecting said scanned separated optical beams onto said photosensitive member, wherein the difference in number of reflections by said separating means and said reflecting means between each of said two separated optical beams, after said scanning means and before said photosensitive member, is an even number.

7. A multi-beam optical system as set forth in claim 6, wherein said composing means and said separating means comprise dichroic mirrors.

8. A multi-beam optical system, comprising:

a light source for forming an image on a photosensitive member, said light source capable of emitting a first optical beam and a second optical beam;

composing means for composing said first beam and said second beam into one single composite beam;

scanning means for scanning said single composite beam;

separating means for separating said scanned composite beam into said first beam and said second beam, wherein said first beam is reflected by said separating means and said second beam is transmitted through said separating means without reflecting;

first reflecting means for reflecting said first beam reflected by said separating means and for directing said first beam toward a first location on said photosensitive member;

second reflecting means for reflecting said second beam transmitted through said separating means, and third reflecting means for reflecting said second beam reflected by said second reflecting means and for directing said second beam toward a second location on said photosensitive member.

9. A two-beam optical system as set forth in claim 8, wherein said composing means and said separating means comprise dichroic mirrors.

10. A multi-beam optical system, comprising:

a light source for forming an image on a photosensitive member, said light source capable of emitting a first optical beam, a second optical beam and a third optical beam;

composing means for composing said first beam, said second beam and said third beam into a first single composite beam;

scanning means for scanning said first composite beam;

first separating means for separating said scanned composite beam into said first beam and a second single composite beam consisting of said second beam and said third beam, wherein said first beam is reflected by said first separating means and said second composite beam is transmitted through said first separating means without reflecting;

first reflecting means for reflecting said first beam reflected by said first separating means and for directing said first beam toward a first location on said photosensitive member;

second separating means for separating said second composite beam into said second beam and said third beam, wherein said second beam is reflected by said second separating means and said third beam is transmitted through said second separating means without reflecting;

second reflecting means for reflecting said second beam reflected by said second separating means and for directing said second beam toward a second location on the photosensitive member;

third reflecting means for reflecting said third beam transmitted by said second separating means, and fourth reflecting means for reflecting said third beam reflected by said third reflecting means and for directing said third beam toward a third location on said photosensitive member.

11. A three-beam optical system as set forth in claim 10, wherein said composing means and said separating means comprise dichroic mirrors.

12. A multi-beam optical system, comprising:

a light source for forming an image on a photosensitive member, said light source capable of emitting a first optical beam and a second optical beam;

composing means for composing said first beam and said second beam into one single composite beam;

scanning means for scanning said single composite beam;

separating means for separating said scanned composite beam into said first beam and said second beam, wherein said first beam is reflected by said separating means, and said second beam is transmitted through said separating means without reflecting and directed toward a second location on said photosensitive member, and reflecting means for reflecting said first beam reflected by said separating means and for directing said first beam toward a first location on said photosensitive member.

13. A two-beam optical system as set forth in claim 12, wherein said composing means and said separating means comprise dichroic mirrors.

14. A multi-beam optical system for providing composite images of different colors from a photosensitive member, comprising:

a light source for forming images on a photosensitive member, said light source capable of emitting a first optical beam and a second optical beam;

composing means for composing said first beam and said second beam into one single composite beam;

scanning means for scanning said single composite beam;

separating means for separating said scanned composite beam into said first beam and said second beam, wherein said first beam is reflected by said separating means, and said second beam is transmitted through said separating means without reflecting;

means for directing said first and second beams towards separate locations on the photosensitive member, including at least one reflecting member, wherein said at least one reflection member compensates for any relative inversion of an image between the image formed by said first optical beam and the image formed by said second optical beam thereby minimizing any orientation distortion in the composite image.

15. A multi-beam optical system as set forth in claim 14, wherein said composing means and said separating means comprise dichroic mirrors.

* * * * *